UNITED STATES PATENT OFFICE.

WILLIAM M. RUNYON, R. H. HALLER, AND I. B. MORRIS, OF OSKALOOSA, IOWA.

IMPROVED MEDICINE FOR HOG-CHOLERA.

Specification forming part of Letters Patent No. 58,890, dated October 16, 1866.

*To all whom it may concern:*

Be it known that we, WM. M. RUNYON, R. H. HALLER, and I. B. MORRIS, of Oskaloosa, in the county of Mahaska, in the State of Iowa, have invented a new and useful composition of matter—viz., a Medicine for the Cure of the Disease of Swine commonly known as "Hog-Cholera;" and we do declare that the following is a full, clear, and exact description of the mode of compounding and administering the same, reference being had to the specimens herewith filed.

The said composition is compounded as follows, viz: Take of madder, two pounds; flowers of sulphur, two pounds; rosin, two pounds; saltpeter, two pounds; black antimony, one pound; copperas, one pound; asafetida, eight ounces; black pepper, two ounces; arsenic, two ounces.

Pulverize the several ingredients thoroughly and mix them well together.

The powder thus prepared is mixed with equal parts of salt and wood-ashes, and administered as a preventive twice a week, one gill being administered with the salt and ashes to twenty-five head of hogs.

When the disease has attacked the animal the doses must be increased in frequency, say one dose in the above proportions per day.

The above proportions are deemed the best; but we do not restrict our claim to the precise proportions stated, nor to the exact mode of administering the same.

What we claim as our invention, and desire to secure by Letters Patent, is—

A composition of matter compounded of the above-enumerated ingredients, or their chemical equivalents, and prepared for use substantially in the manner and for the purpose set forth.

In testimony whereof we have signed our names to this specification in the presence of two subscribing witnesses.

WM. M. RUNYON.
R. H. HALLER.
I. B. MORRIS.

Witnesses:
  JAS. MCDONNELL,
  R. P. BACON.